United States Patent
Cunningham et al.

(10) Patent No.: US 8,511,997 B2
(45) Date of Patent: Aug. 20, 2013

(54) UNIFORM FATIGUE LIFE SPHERICAL ELASTOMERIC BEARING

(75) Inventors: Robert Cunningham, Stamford, CT (US); Francis Edward Byrnes, White Plains, NY (US)

(73) Assignee: Sikorsky Aircraft Corporation, Stratford, CT (US)

( * ) Notice: Subject to any disclaimer, the term of this patent is extended or adjusted under 35 U.S.C. 154(b) by 1643 days.

(21) Appl. No.: 11/959,945

(22) Filed: Dec. 19, 2007

(65) Prior Publication Data

US 2009/0162201 A1 Jun. 25, 2009

(51) Int. Cl.
*B64C 27/35* (2006.01)

(52) U.S. Cl.
USPC ............. 416/134 A; 267/141.1; 384/129

(58) Field of Classification Search
None
See application file for complete search history.

(56) References Cited

U.S. PATENT DOCUMENTS

| | | |
|---|---|---|
| 2,051,864 A | 8/1936 | Knox et al. |
| 2,066,187 A | 12/1936 | Piron |
| 2,068,279 A | 1/1937 | Piron |
| 2,069,270 A | 2/1937 | Piron |
| 2,126,707 A | 8/1938 | Schmidt |
| 2,127,219 A | 8/1938 | Hirshfeld |
| 2,149,297 A | 3/1939 | Knox |
| 2,158,028 A | 5/1939 | Burke |
| 3,216,593 A | 11/1965 | Reuter et al. |
| 3,380,557 A | 4/1968 | Peterson |
| 3,467,353 A | 9/1969 | Peterson et al. |
| 3,679,197 A * | 7/1972 | Schmidt ................. 267/152 |
| 3,700,352 A | 10/1972 | Gorndt |
| 3,759,632 A | 9/1973 | Rybicki |
| RE30,262 E | 4/1980 | Schmidt |
| 4,419,398 A | 12/1983 | Coffy et al. |
| 5,092,738 A | 3/1992 | Byrnes et al. |
| 5,366,324 A | 11/1994 | Arlt et al. |
| 5,482,406 A | 1/1996 | Arlt, III |
| 5,601,408 A * | 2/1997 | Hunter et al. ............. 267/141.1 |
| 5,628,586 A | 5/1997 | Arlt, III |
| 5,641,248 A | 6/1997 | Arlt, III |
| 5,658,095 A | 8/1997 | Arlt et al. |
| 6,481,894 B1 | 11/2002 | James |
| 6,568,906 B2 | 5/2003 | Gharibian et al. |
| 6,666,648 B2 | 12/2003 | Bernhard et al. |
| 6,695,583 B2 | 2/2004 | Schmaling et al. |
| 6,803,095 B1 | 10/2004 | Halladay et al. |
| 6,860,015 B2 | 3/2005 | Muylaert |
| 6,889,965 B2 | 5/2005 | Loftus et al. |
| 6,971,853 B2 | 12/2005 | Chemouni et al. |
| 7,097,169 B2 | 8/2006 | Mueller |

FOREIGN PATENT DOCUMENTS

| | | |
|---|---|---|
| DE | 680988 | 8/1939 |
| FR | 934336 | 9/1946 |
| GB | 465394 | 5/1937 |
| GB | 828065 | 2/1960 |

OTHER PUBLICATIONS

International Search Report dated Aug. 28, 2009.

* cited by examiner

*Primary Examiner* — Richard Edgar
(74) *Attorney, Agent, or Firm* — Carlson, Gaskey & Olds P.C.

(57) ABSTRACT

An elastomeric spherical bearing includes a multiple of elastomeric layers with an essentially equivalent fatigue life.

15 Claims, 4 Drawing Sheets

UNIFORM FATIGUE LIFE SPHERICAL ELASTOMERIC BEARING

STATEMENT REGARDING FEDERALLY SPONSORED RESEARCH OR DEVELOPMENT

This invention was made with Government support under N00019-06-C-0081 awarded by The United States Navy. The Government has certain rights in this invention.

BACKGROUND OF THE INVENTION

The present invention relates to an elastomeric bearing.

One goal of elastomeric spherical bearing design is the smallest/lightest package that meets the desired design life requirements. The design life is typically determined through a single motion strain. One conventional elastomeric bearing design methodology discloses how to develop a bearing with a uniform steady compression induced strain, $\gamma_{Tc}$, and a uniform strain distribution for one motion pitch $\gamma_\theta$ or flap $\gamma_\beta$. Such conventional elastomeric bearing design methodology, however, does not account for coupled load and motion or for the fatigue damage from additional motion strains. That is, the actual life of each layer is not dependent exclusively on pitch or flap strain as pressured by this conventional methodology. Furthermore, the conventional methodology generates a bearing that does not provide uniform life at each layer and may therefore result in a relatively inefficient elastomeric bearing.

SUMMARY OF THE INVENTION

An elastomeric spherical bearing according to an exemplary aspect of the present invention includes a multiple of elastomeric layers, each of said multiple of elastomeric layers having an essentially equivalent fatigue life.

A method of calculating a uniform life spherical elastomeric bearing according to an exemplary aspect of the present invention includes adjusting each layer thickness to produce a uniform fatigue life of each bearing layer.

BRIEF DESCRIPTION OF THE DRAWINGS

The various features and advantages of this invention will become apparent to those skilled in the art from the following detailed description of the currently disclosed embodiment. The drawings that accompany the detailed description can be briefly described as follows.

DETAILED DESCRIPTION OF THE DISCLOSED EMBODIMENT

Figure 1:
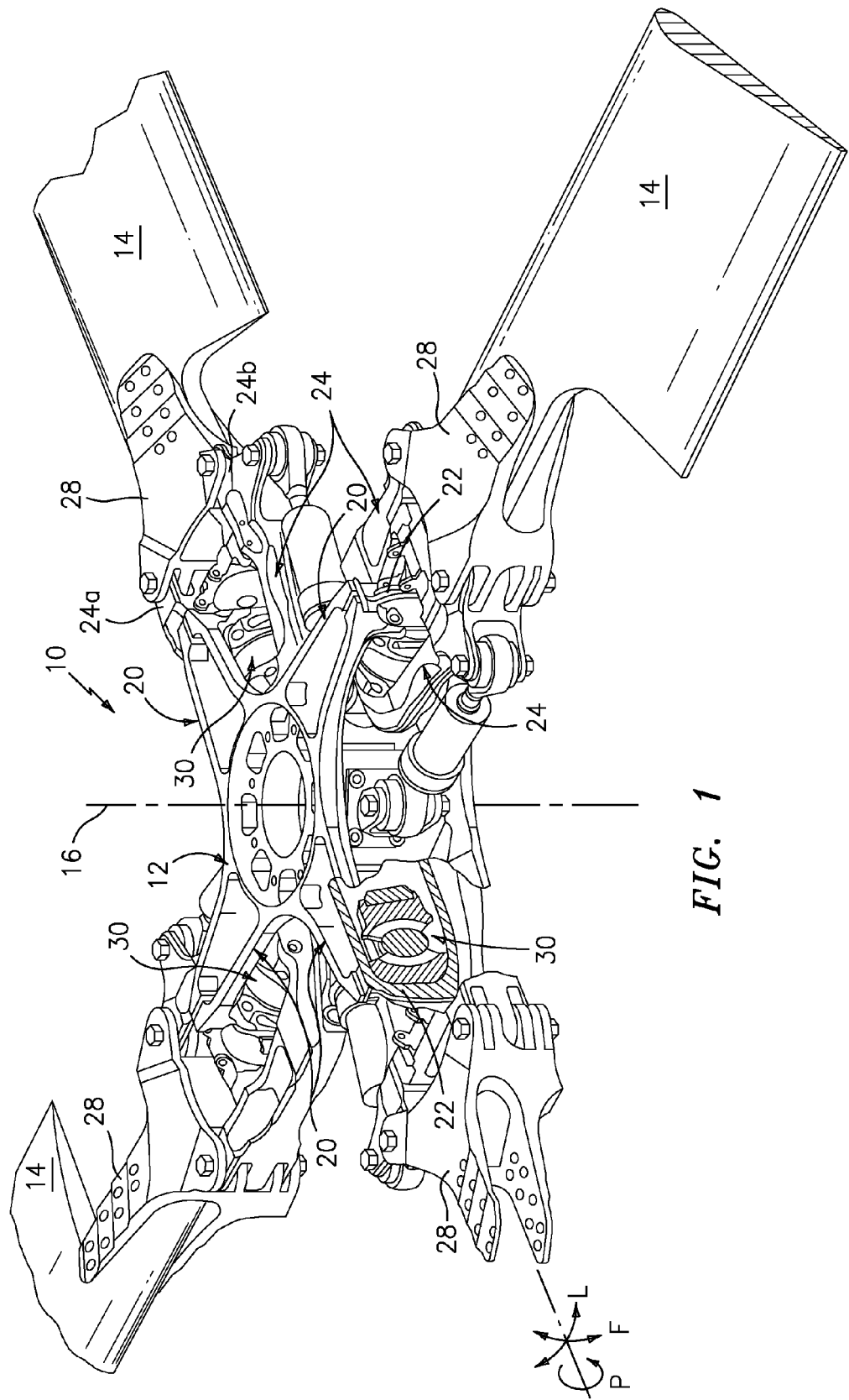
FIG. 1 is a perspective view a rotor head assembly utilizing an elastomeric bearing according to one non-limiting embodiment of the present invention.

Referring to FIG. 1, a rotor hub assembly 10 typical of a rotary-wing aircraft includes a hub retention member 12 which drives a plurality of rotor blade assemblies 14 about an axis of rotation 16.

The hub retention member 12 includes a plurality of radial spokes 20 and shear segments 22. Each shear segment 22, in combination with its respective radial spokes 20, form a structural loop for accepting a rotor assembly yoke 24. The yoke 24 is generally C-shaped and circumscribes, in looped fashion, the respective shear segment 22. The yoke 24 is disposed in combination with a cuff structures 28 which, in turn, mount to the root end of each rotor blade assembly 14.

A spherical elastomeric bearing assembly 30 is interposed between each rotor assembly yoke 24 and the respective shear segment 22 to accommodate the multi-directional displacement of the rotor blade assembly 14.

Figures 2A, 2B:
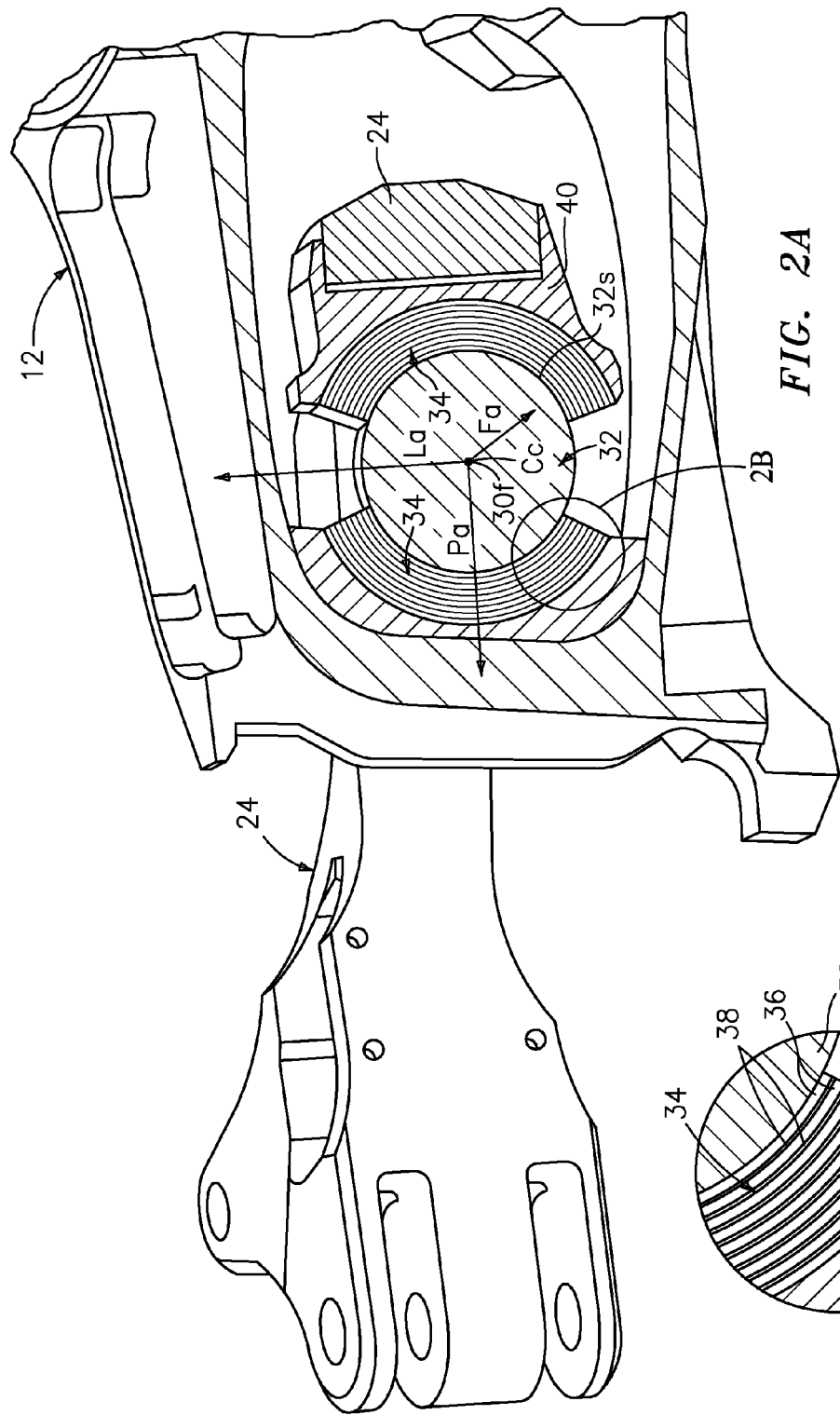
FIG. 2A is an enlarged broken-away perspective view of the elastomeric bearing in combination with a rotor assembly yoke and shear segment of the rotor hub assembly of FIG. 1.
FIG. 2B depicts an enlarged view of the elastomeric laminates of the elastomeric bearing of FIG. 2A.

Referring to FIG. 2A, the spherical elastomeric bearing 30 is shown in combination with a rotor assembly yoke 24 and a respective shear segment 22. The spherical elastomeric bearing 30 includes a central bearing element 32 having a spherical bearing surface 32s which defines a bearing focal point 30f. The bearing focal point 30f defines the flap, lead-lag and pitch axes, Fa, La, and Pa, respectively, about which the rotor blade assembly articulates.

To the spherical surface 32s is bonded discrete spherical elastomeric elements 34 about the bearing focal point 30f. Furthermore, each spherical elastomeric element 34 includes a multiple of alternating layers (see FIG. 2B) of elastomer 36 and nonresilient shims 38, respectively, which are disposed at increasing radii from the bearing focal point 30f and have a center of curvature C.sub.c which is coincident therewith.

Each elastomeric layer 36 of the elastomeric spherical bearing 30 provides a uniform fatigue life as will be further described below. It should be understood that although a particular rotor hub application is illustrated in the disclosed non-limiting embodiment, elastomeric bearing for any application including but not limited to aerospace, heavy machinery, and civil engineering (bridges, buildings, etc.) will benefit herefrom.

Each spherical elastomeric bearing layer 36 has a fatigue curve with alternating strain (S) as the ordinate, and cycles to failure (N) as the abscissa (S-N). The fatigue life of each elastomer bearing layer 36 can be approximated from the S-N curves by the following equations (1)-(5):

Pitch Angle Motion+/−θ

$$N_\theta = \left(\frac{C}{\gamma_\theta}\right)^\alpha \quad (1)$$

where $\gamma_\theta$ equals the pitch strain as a percentage and $N_\theta$ equals the number of cycles to failure. C and $\alpha$ are constants (general values below) that are derived from curve fitting methods to approximate the particular S-N curve.

C ~5000;

$\alpha$ ~3.5 to 5.0

Flap Angle Motion +/−3

$$N_\beta = \left(\frac{0.8C}{\gamma_\beta}\right)^\alpha \quad (2)$$

Coupled $T_c$ and Flap Shear $T_c \cdot \sin \beta_i$ $$N_{\gamma s} = \left(\frac{0.576C}{\gamma_s}\right)^{1.6\alpha} \quad (3)$$

Where $\gamma_s$ is the shear strain

The life of a layer is calculated from the combined cumulative damage of the two motions and the shear load.

$$NN = \frac{1}{N_\theta} + \frac{1}{N_\beta} + \frac{1}{N_{\gamma s}} \quad (4)$$

Such that fatigue life:

$$\frac{1}{NN} \quad (5)$$

Figure 3:
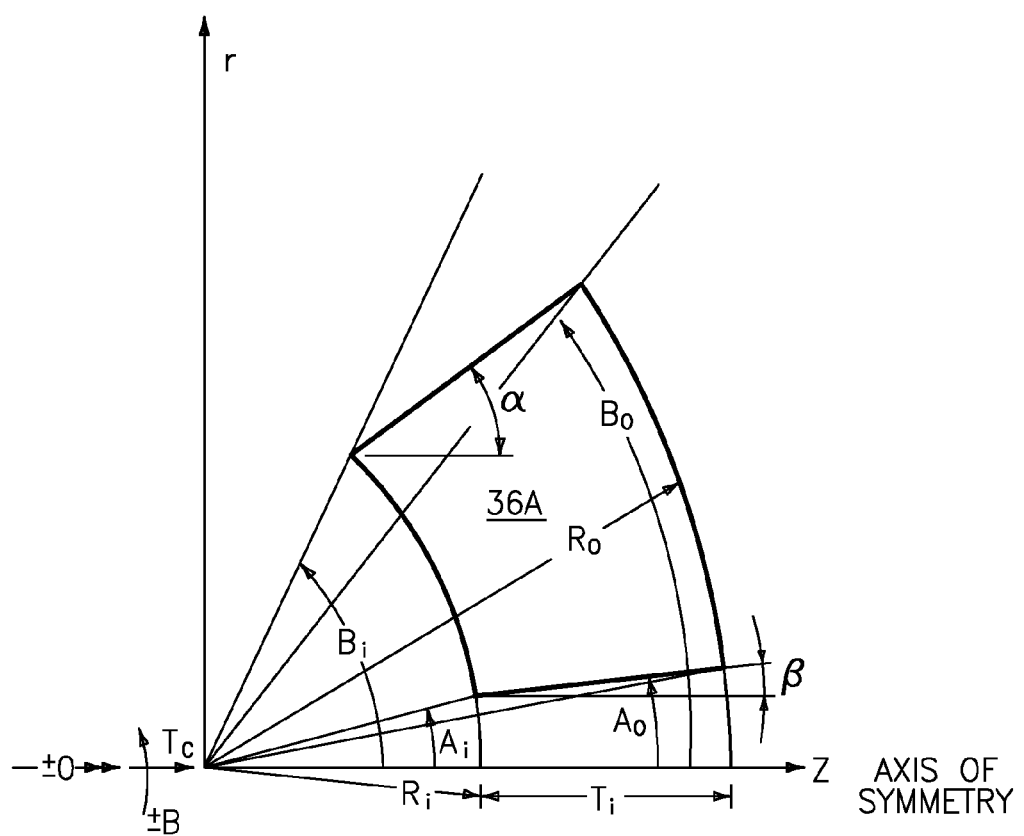
FIG. 3 is a schematic view of a section of one segment of an elastomeric layer of the elastomeric bearing.

Referring to FIG. 3, a section of one layer 36A of the elastomeric spherical bearing 30 is schematically illustrated such that nomenclature may be defined. The section 36A includes an outwardly facing convex surface 40 and an inwardly facing concave surface 42. It should be understood that the section 36A is representative of a single layer of an elastomeric material which may be attached to another layer (not shown)

Fatigue Loading:
Pitch Angle Motion $+/-\theta$;
Flap Angle Motion $+/-\beta$;
Shear Loading $+/-T_c \cdot \sin \beta_i$
  Where $T_c$ is the compression load.
Initial Practice Design Constraints:
Shear Modulus $G_{1stLayer}=240$ psi
Compression Shear Strain $\gamma_{Tc}=100\%$ For the first layer
Pitch Strain $+/-\beta_\theta=35\%$ For All Layers
First Layer:
Compressive Shear Strain: $\gamma_{Tc}=100\%$
Calculate Pitch Strain $\gamma_\theta$ and Flap Strain $\gamma_\beta$
Normalize Pitch Strain $\gamma_\theta$ to 35%
Calculate Normalized $\gamma_\beta$ to $\beta_i$ $$\gamma_{vi}=f(T_c \sin \beta_i)$$

Calculate
Adjust layer thickness, $t_1$ to obtain desired life [iterate using approach 1, "Local Flow chart Methodology" (below)].
Repeat until Pitch Strain, $\gamma_\theta=35\%$ For all layers
Local Flow Chart Methodology—Approach #1—Constant $+/-\gamma\theta$ Pitch Strain Percentage
Design Bearing for a Uniform Vibratory Pitch Shear Strain by varying the layer shear modules by:

$$G_i = \frac{G_{i-1} R_{i-1}^3 \phi_{i-1} \sin \beta_i}{R_i^3 \phi_i \sin \beta_{i-1}} \quad (6)$$

Where
$G_i$ is the elastomer layer shear modulus;

$G_{i-1}$ is the previous elastomer layer shear modulus (starting at the layer closest to the focal point);
$R_i$ is the mean radius of the layer;
$R_{i-1}$ is the mean radius of the previous layer (starting at the layer closest to the focal point); and $$\phi_i = \cos A_i \cdot \sin A_i^2 + 2 \cdot \cos A_i - \cos B_i \cdot \sin B_i^2 - 2 \cdot \cos B_i \quad (7)$$

Where $A_i$ is the Inner Angle and $B_i$ is the outer angle.
For a given fatigue Life $$\frac{1}{N_\beta} = \frac{1}{\frac{1}{\text{Life}} - \frac{1}{N_\theta}} \quad (8)$$

Using Equations (1)-(8)

$$\hat{\gamma}_s = \left[\left\{\frac{1}{N\hat{\beta}}\hat{\beta}\right\}^{\frac{1}{\alpha}}\right]^{-1} (0.8C) - \gamma_\beta \quad (9)$$

$$\gamma_s = \frac{0.576C}{\left\{\frac{0.8C}{\hat{\gamma}_s}\right\}^{\frac{1}{1.6}}} \quad (10)$$

Adjusting the layer thickness such that the actual bearing shear strain equals the above calculated shear strain constraint (equation 10), will produce a uniform fatigue life for each bearing layer.

Utilizing the Equations described above, one calculation procedure according to one non-limiting embodiment of the present invention is as follows:

1.) Determine Loads and Motions.
   a. Determine the axial load. The axial load acts in a direction parallel to the Z axis of rotation. For helicopters, this is generally the centrifugal force from the rotor blade.
   b. Determine the radial load. The radial load acts in the R, radial direction. This is usually the shear load on the rotor blade.
   c. Determine the vibratory pitch motion (theta) angle. This motion rotates about the Z axis and is sometimes referred to as the torsional rotation. This motion is a vibratory motion. The angle is a plus or minus motion from the origin.
   d. Determine the flapping (cocking) motion angle.
2.) Determine Fatigue Life Desired (In Number Of Cycles Or Hours).
3.) Enter Bearing Dimensions.
   a. Inner radius (Ri), Inner Angle (Bi), Inner Angle (Ai), Side Angle (Alpha) sometimes referred to as outer taper angle, and Side Angle (Blpha) sometimes referred to as inner taper angle.
   b. Enter Shim thickness
4.) Enter Bearing Elastomer Material Properties.
   a. Enter Bulk modulus of elastomer, (Kb, psi). A value of 200,000 psi is good practice.
   b. Enter the first layer shear modulus (G, psi). A value of 240 psi is good practice.
5.) Calculate Geometries. Inner And Outer Angles, Inner And Outer Radius, Mean Radius, Etc.
6.) Calculate Shape Factors Per Layer.
7.) Calculate Effective Compression Modulus (Ec)

8.) Calculate Radial And Axial Strains To Get Compression Shear Strain. Change Layer Thickness To Achieve Compression Strain Allowable.
9.) Calculate Stiffnesses (Radial, Axial, Flapping, And Torsional Stiffnesses)
10.) Calculate Torsional Strain. Add More Layers To Achieve Allowable.
11.) The Shear Modulus Is Calculated From The Geometry To Achieve A Uniform Torsional Strain. (See Equation #6 For Shear Modulus)
12.) Calculate Flapping Strain
13.) Calculate Shear Strain Allowable $\gamma_s$.
14.) Calculate Life
15.) Vary The Thicknesses Of Each Layer To Meet Shear Strain Allowable and to Achieve Uniform Life.

It should be understood that the instructions are basically the same for a solid bearing and a bearing with a central opening. It should also be understood that an elastomeric bearing with any number of layers may be calculated by the method herein. By way of illustration, an elastomeric bearing 30A with three layers according to one non-limiting embodiment, has inputs delineated in the chart below:

| Inputs | |
| --- | --- |
| Bearing Parameters | |
| Side Angle, BLPHA (deg) | 0 |
| Inner Angle Ai (deg) | 0 |
| Design Life (hours) | 2,000 |
| Applied Loads | |
| Radial Loads, Pradial (lbf) | 100 |
| Axial Loads, Paxial (lbf) | 122,500 |
| Torsional Rotation, theta (deg) | 1.68 |
| Flapping Rotation, beta (deg) | 0.96 |
| Shear Correction Factor | 0.7 |
| Bulk modulus of elastomer, Kb (psi) | 200,000 |
| Rotor Info | |
| Rotor RPM, 100% NR | 246 |
| Frequency (omega) | 4.1 |

To provide the following properties:

| Final Bearing Properties | |
| --- | --- |
| Geometry | |
| Inner Radius Ri (in) | 4.98 |
| Outer Radius Ro (in) | 5.43 |
| Inner Angle Ai (deg) | 0.00 |
| Outer Angle Ao (deg) | 0.00 |
| Inner Angle Bi (deg) | 60.00 |
| Outer Angle Bo (deg) | 57.01 |
| Side Angle, ALPHA (deg) | 27 |
| Side Angle, BLPHA (deg) | 0 |
| Stiffnesses | |
| Radial Stiffness (lb/in) | 4,909,450 |
| Axial Stiffness (lb/in) | 14,815,628 |
| Torsion Stiffness (in-lb/rad) | 540,147 |
| Torsion Stiffness (in-lb/deg) | 9,427 |
| Flapping Stiffness (in-lb/rad) | 1,079,065 |
| Flapping Stiffness (in-lb/deg) | 18,833 |
| Shim Thickness (in) | 0.0355 |
| Life (hours) | 2,000 |
| Number of Elastomer Layers | 3 |

Figure 4:
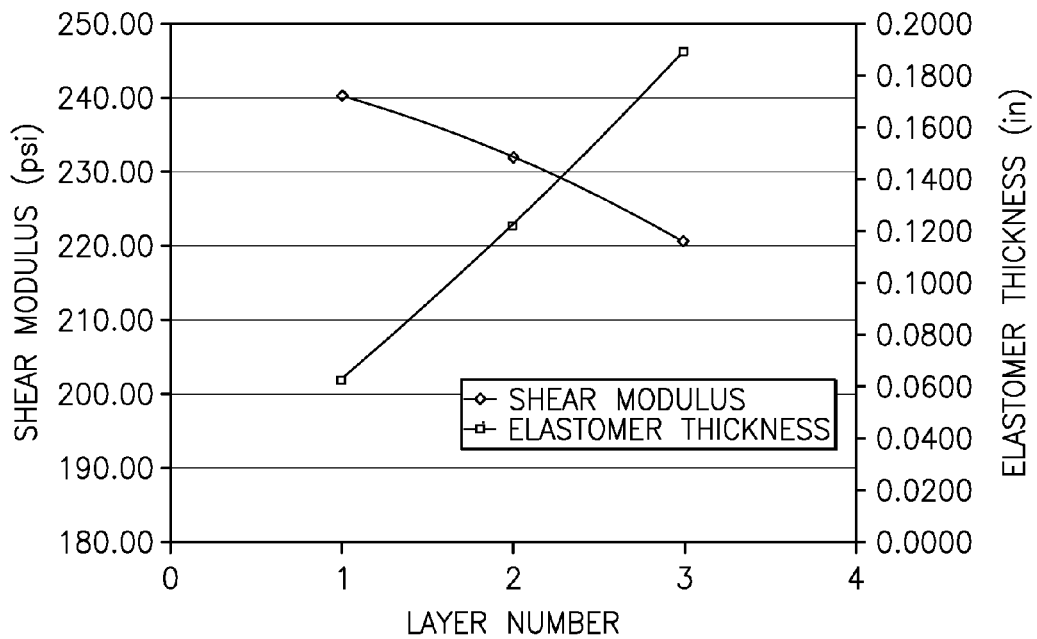
FIG. 4 is graph representing the shear modulus and elastomer thickness of one elastomeric bearing with three layers according to one non-limiting embodiment of the present invention.
Figure 5:
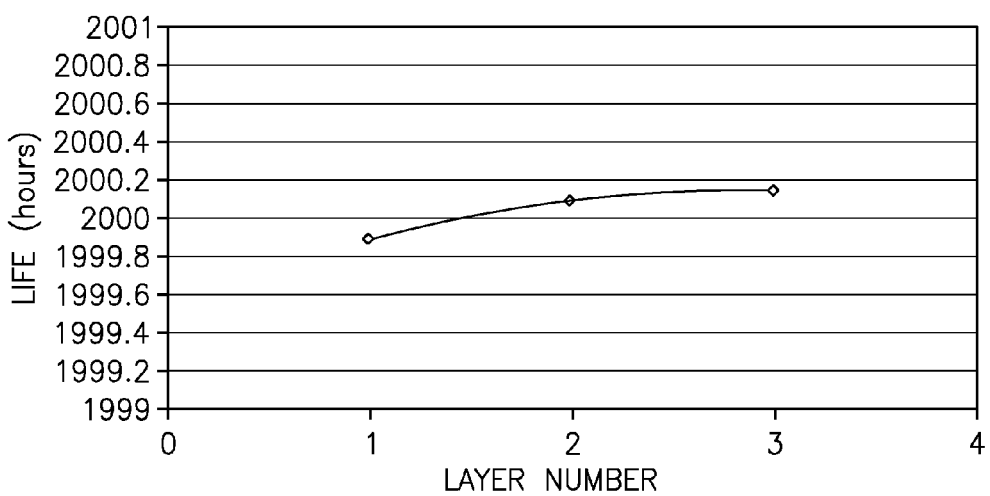
FIG. 5 is a graph of the elastomeric bearing of FIG. 4 illustrating an essentially equivalent elastomeric layer life.

These properties provide a shear modulus and elastomer thickness by layer (FIG. 4) such that each layer the elastomeric bearing 30 has an essentially equivalent life (FIG. 5).

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A method of providing a thickness of a spherical elastomeric bearing comprising:
adjusting each layer thickness of an elastomeric bearing having uniform pitch strain to satisfy:

$$\gamma_s = \frac{0.576C}{\left[(0.8C)\left[\left[\frac{1}{\text{Life}} - \left(\frac{C}{\gamma_\theta}\right)^{-\alpha}\right]^{\frac{1}{\alpha}}\right](0.8C) - \gamma_\beta\right]^{-1}\right]^{\frac{1}{1.6}}}$$

to produce a uniform fatigue life of each bearing layer where:
C and $\alpha$ are constants derived from curve fitting methods to approximate the particular S-N curve;
$L_{ife}$ is the desired fatigue life;
$\gamma_\theta$ is the pitch strain;
$\gamma_\beta$ is the flap strain; and
providing a first layer thickness and changing the first layer thickness to a different, second layer thickness in response to the adjusting.

2. A method as recited in claim 1, wherein the thickness of each layer is varied until the Pitch Strain, the Pitch Strain ($\gamma_\theta$) is approximately 35% for all layers.

3. A method as recited in claim 1, wherein C is between 4000 and 6000.

4. A method as recited in claim 1, wherein C is ~5000.

5. A method as recited in claim 1, wherein uniform pitch strain is calculated to satisfy:

$$G_i = \frac{G_{i-1} R_{i-1}^3 \phi_{i-1} \sin B_i}{R_i^3 \phi_i \sin B_{i-1}}$$

where:
$G_i$ is the elastomer layer shear modulus;
$G_{i-1}$ is the previous elastomer layer shear modulus (starting at the layer closest to the focal point);
$R_i$ is the mean radius of the layer,
$R_{i-}$ is the mean radius of the previous layer (starting at the layer closest to the focal point), and $$\phi_i = \cos A_i \cdot (\sin A_i)^2 + 2 \cdot \cos A_i - \cos B_i \cdot (\sin B_i)^2 - 2 \cdot \cos B_i$$

where:

$A_i$ is the Inner Angle and $B_i$ is the outer angle, to produce a uniform fatigue life of each bearing layer.

6. A method as recited in claim 3, wherein the thickness of each layer is varied until the Pitch Strain ($\gamma_\theta$) is approximately 35% for all layers.

7. An elastomeric spherical bearing comprising:
   a multiple of elastomeric layers produced by the method of claim 1; and
   a shim mounted between at least two of said multiple of elastomeric layers, each of said multiple of elastomeric layers having an essentially equivalent fatigue life.

8. The elastomeric spherical bearing as recited in claim 7, wherein an inner layer of said multiple of elastomeric layers is mounted to a central bearing element having a spherical bearing surface.

9. The elastomeric spherical bearing as recited in claim 8, wherein an inner layer of said multiple of elastomeric layers is mounted to a rotor assembly component.

10. The elastomeric spherical bearing as recited in claim 8, wherein an outer layer of said multiple of elastomeric layers is mounted to a cuff structures of a rotor assembly.

11. A method of providing a thickness of for a spherical elastomeric bearing comprising the steps of:
   1.) Determining Loads and Motions;
   2.) Determining Fatigue Life Desired;
   3.) Entering Bearing Dimensions;
   4.) Entering Bearing Elastomer Material Properties;
   5.) Calculating Geometries;
   6.) Calculating Shape Factors Per Layer;
   7.) Calculating Effective Compression Modulus (Ec) Per Layer;
   8.) Calculating Radial And Axial Strains To Get Compression Shear Strain Per Layer;)
   9.) Calculating Stiffnesses (Radial, Axial, Flapping, And Torsional Stiffnesses);
   10.) Calculating Torsional Strain and add layers to achieve allowable torsional strain;
   11.) Calculating the Shear Modulus to Achieve A Uniform Torsional Strain;
   12.) Calculating a Flapping Strain;
   13.) Calculating Shear Strain Allowable;
   14.) Calculating Life;
   15.) Varying the Thicknesses Of Each Layer To Meet Shear Strain Allowable to Achieve Uniform Life; and
   16.) providing a first layer thickness and changing the first layer thickness to a different, second layer thickness during the varying.

12. A method as recited in claim 11, wherein said Determining Loads and Motions further comprise:
   a. Determine the axial load;
   b. Determine the radial load;
   c. Determine the vibratory pitch motion (theta) angle;
   d. Determine the flapping (cocking) motion angle.

13. A method as recited in claim 11, wherein said Entering Bearing Dimensions further comprise:
   a. Inner radius (Ri), Inner Angle (Bi), Inner Angle (Ai), Side Angle (Alpha); and Side Angle (Blpha);
   b. Enter Shim thickness.

14. A method as recited in claim 11, wherein said Entering Bearing Elastomer Material Properties further comprise:
   a. Entering Bulk modulus of elastomer, (Kb, psi); and
   b. Entering the fist layer shear modulus (G, psi).

15. A method as recited in claim 11, wherein said calculating radial and axial strains to obtain compression shear strain further comprises:
   a. changing a layer thickness to achieve allowable compression strain.

* * * * *